US005902685A

United States Patent [19]

Schröder et al.

[11] Patent Number: 5,902,685

[45] Date of Patent: May 11, 1999

[54] ROLL, METHOD OF PRODUCING A ROLL AS WELL AS MATERIAL BED ROLL MILL

[75] Inventors: Heinz Schröder, Beckum; Oswald Haberhauer, Bochum, both of Germany

[73] Assignee: Krupp Polysius AG, Beckum, Germany

[21] Appl. No.: 08/584,346

[22] Filed: Jan. 11, 1996

[30] Foreign Application Priority Data

Feb. 24, 1995 [DE] Germany .......................... 195 06 600

[51] Int. Cl.[6] ............................... B32B 3/00; B32B 7/02; B02C 4/08; B23P 15/00

[52] U.S. Cl. .......................... 428/615; 428/600; 428/601; 428/687; 428/397; 428/400; 428/167; 428/217; 428/323; 428/906; 428/908.8; 492/28; 492/33; 492/36; 241/235; 29/895; 29/895.21; 29/895.213; 29/895.3

[58] Field of Search ................................. 492/28, 30, 33, 492/35, 36; 29/895, 895.21, 895.213, 895.3; 241/227, 235, 277; 451/194, 424; 428/143, 148, 156, 167, 168, 169, 172, 173, 323, 457, 600, 601, 615, 621, 687, 906, 908.8, 217, 397, 400

[56] References Cited

U.S. PATENT DOCUMENTS

| | | | |
|---|---|---|---|
| 3,947,269 | 3/1976 | Prasse et al. . | |
| 4,497,660 | 2/1985 | Lindholm . | |
| 4,879,791 | 11/1989 | Herb | 29/148.4 D |
| 5,199,657 | 4/1993 | Kästingschäfer et al. | 241/235 |
| 5,225,007 | 7/1993 | Hattori et al. | 148/541 |
| 5,307,973 | 5/1994 | Schmidt et al. | 226/190 |
| 5,312,056 | 5/1994 | Kästingschäfer et al. | 241/235 |
| 5,381,977 | 1/1995 | Otte | 241/227 |
| 5,601,520 | 2/1997 | Wollner et al. | 492/33 |
| 5,704,561 | 1/1998 | Ansén et al. | 241/293 |

FOREIGN PATENT DOCUMENTS 4210395 10/1993 Germany .

*Primary Examiner*—Marie Yamnitzky
*Attorney, Agent, or Firm*—Reising, Ethington, Barnes, Kisselle, Learman & McCulloch, P.C.

[57] ABSTRACT

A grinding roll for use in a material bed roll mill for the comminution of brittle material has a cylindrical body in the periphery of which are alternating grooves and lands. To the exterior of each land is secured a wear strip. The grooves of the confronting rolls may be directly opposite one another or the grooves may be offset axially so that the grooves in one roll confront a land of the opposite roll.

30 Claims, 3 Drawing Sheets

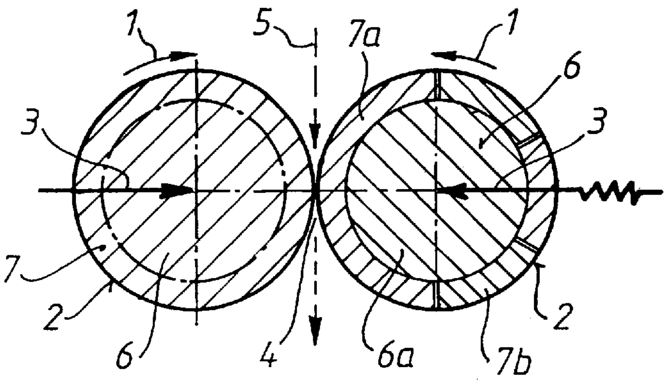
FIG.1
FIG.2
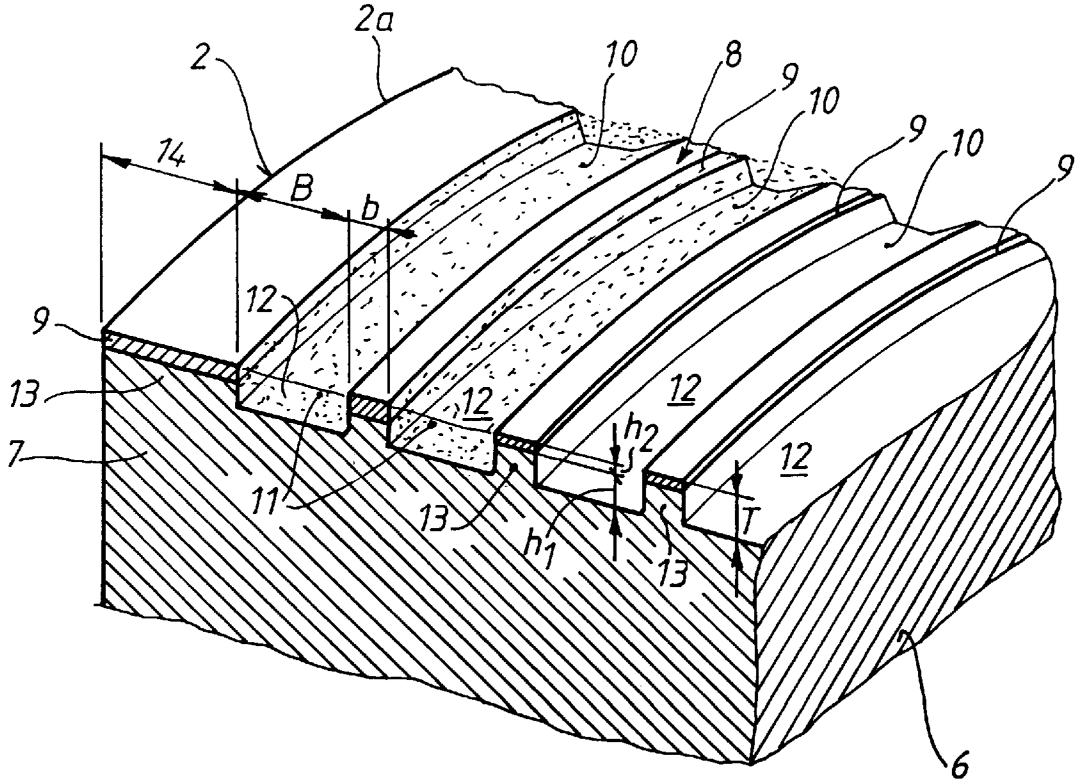

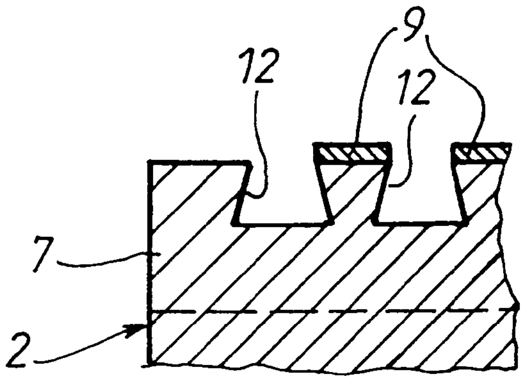
FIG. 3
FIG. 4
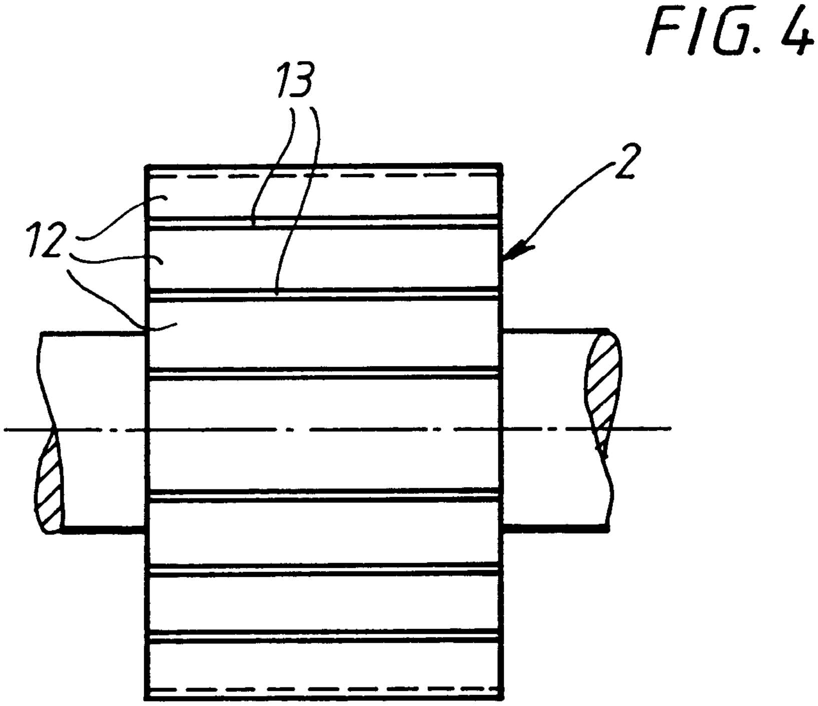

ROLL, METHOD OF PRODUCING A ROLL AS WELL AS MATERIAL BED ROLL MILL

The invention relates to a roll and a method of producing such roll it also relates to a material bed roll mill for the comminution of brittle materials for grinding subsequent.

BACKGROUND OF THE INVENTION

A known roll is described for example in connection with a material bed roll mill in DE-A-42 10 395. In this known construction a chill-cast roll casing is fixed on a basic roll body so as to be replaceable, and profiling weld beads can be applied on the outer surface or the outer circumferential surface of this roll casing according to certain designs in such a way that a profiled cladding for protection against wear is produced with outwardly projecting hard material strips applied by build-up welding and depressions between these strips into which particles of mill feed material are pressed and thus form an autogenous wear protection for the casing surface. At the same time these measures create a good capacity for drawing in the material to be comminuted in the grinding gap between the two rolls.

The object of the invention is to make further improvements to such a roll, to improve the a method of producing such roll, and to provide an improved a material bed roller mill so that a particularly durable wear protection of the roll surface can be ensured as well as a reliable capacity for drawing in material and co-operation of such rolls even in the case of relatively low consumption of hard material.

SUMMARY OF THE INVENTION

Whereas in the other known roll constructions which are described above and are somewhat comparable profiles have been produced on the roll casing by welding strips of hard material onto the smooth outer face (outer circumferential face) thereof according to a specific design, so that depressions are formed between these strips which are to be filled with particles of mill feed material, the cladding for protection against wear according to the invention is clearly constructed in a different way on the outer face of the roll casing or of a circumferential casing region. According to the invention this cladding for protection against wear is constructed by the production of negative profilings, for instance in the form of profile grooves, in the material of the circumferential casing region (or of the separately constructed roll casing) from the outer face, the particles of material being pressed firmly into these profilings—particularly during the comminution process in a material bed roll mill—and the hard material strips are only welded onto the land-like profile projections which delimit the profile grooves. Thus in this roll constructed according to the invention the depressions of the profiled cladding for protection against wear are determined not only by the material height or material thickness of the hard material strips applied to the outer face of the roll casing by hard-facing, but on the one hand by the—radial—depth of the profile grooves machined into the roll material and on the other hand by the material height or thickness of the hard material strips. Since these hard material strips are welded only onto the land-like profile projections which delimit the profile grooves or are present or remain standing between the profile grooves, the roll construction according to the invention can be optimised by comparison with the known rolls, particularly grinding rolls, in that comparatively little of the relatively expensive highly wear-resistant hard material has to be used. In this case a sufficiently solid autogenous wear protection can be created above all by the particles of material pressed into the profile grooves (largely or almost completely filling these profile grooves) in the regions between the hard material strips, so that the outer face of the circumferential casing region or of the roll casing as a whole can ensure a particularly good durable wear protection for the roll surface and also at the same time can ensure a very reliable capacity of the rolls thus formed for drawing in material.

In this roll according to the invention it is also advantageous if the profile grooves have a cross-section with a depth: width ratio of approximately 0.4 to 0.75, the profile depth being formed—as already indicated—by the sum of the radial land height of the exposed profile projections and the radial material height of the hard material strips. In this way a particularly high stability of the profiling is created. In this case it is also particularly advantageous if the material height of the hard material strips is approximately 3 to 15 mm, preferably approximately 4 to 8 mm, depending upon the particular material to be worked or processed. In this case the profile grooves advantageously have a maximum cross-sectional width of approximately 30 to 40 mm.

A further advantageous embodiment of the invention is to be seen in the fact that the hard material strips are produced from a metal matrix with tungsten carbides (or tungsten carbide particles) embedded therein, the particle size of which is approximately 0.1 to 1.2 mm and the proportion by volume approximately 50 to 80% of the total volume of the welded-on hard metal strips.

The invention also relates to the production of a roll, particularly a grinding roll for the comminution of brittle materials for subsequent grinding (e.g. mineral materials, ores or the like) in a material bed roll mill which is known per se in which two such rolls which are driven so that they rotate in opposite directions are pressed toward one another with a high pressure. According to the invention such a roll is produced by the following method steps for constructing the cladding for protection against wear:

a) negative profilings, for instance in the form of profile grooves or the like, are machined from the outer face into the material of the circumferential casing region or of the separately constructed roll casing, and particles of the material to be worked (especially material for grinding) are received and pressed into these profilings;
b) the hard material strips are only welded onto the land-like profile projections which delimit the profile grooves.

A material bed roll mill for the comminution of brittle materials for subsequent grinding is distinguished by the fact that the cladding for protection against wear of each of the two grinding rolls installed there is constructed at least in the manner according to the invention as described above.

THE DRAWINGS

The invention will be explained in greater detail below with reference to the drawings (not only with regard to the design and construction but also with regard to the method of producing the roll and also with regard to the material bed roll mill equipped with two such rolls). In these drawings, which have been kept largely schematic:

FIG. 1 shows a cross-sectional view of two rolls or grinding rolls according to the invention which are co-ordinated for instance in a material bed roll mill;

FIG. 2 shows a perspective view of a portion of a roll in the circumferential casing region, shown on an enlarged scale and partially in longitudinal section;

FIG. 3 shows a partial longitudinal sectional view through the circumferential casing region of the roll for explanation of another embodiment of profile grooves;

FIG. 4 shows a simplified plan view of a further embodiment of the roll;

DETAILED DESCRIPTION

Figure 5:
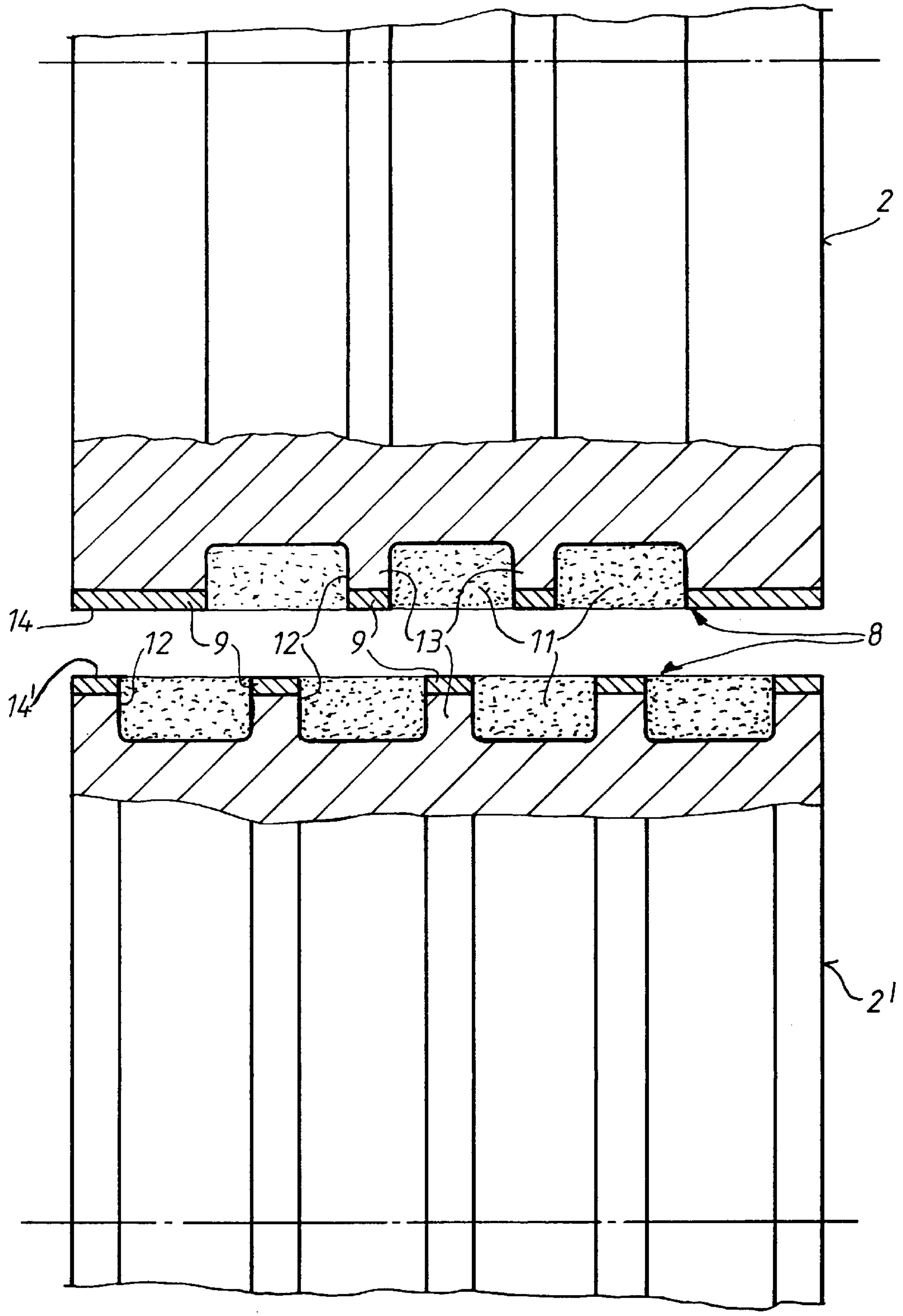
FIG. 5 shows a partial view, partially cut away (in the axial direction), of two grinding rolls co-operating in a material bed roll mill.

In the following explanation of the drawings it may be assumed that rolls constructed according to the invention are used in a particularly advantageous manner as grinding rolls for the comminution of brittle materials for subsequent grinding in a material bed roll mill, although these rolls can also be installed in almost the same way into a roll press or the like, where similar conditions or stresses can frequently occur, if such a roll press is used for instance for pressing any mineral materials, such as for example coal, artificial fertiliser or the like.

First of all the general construction of a material bed roll mill which is known per se will be explained with reference to FIG. 1. In such a roll mill are disposed two rolls which can be driven so that they rotate in opposite directions—according to the arrows 1—and are constructed as grinding rolls 2 which are at least partially elastically pressed against one another with a high pressure (as indicated by arrows 3). Both grinding rolls 2 have the same construction according to the present invention. Between the two grinding rolls 2 is formed a grinding gap 4 through which the material for subsequent grinding passes (broken arrows 5) during the material bed comminution which is known per se and therefore not explained in greater detail. In this case it may also be assumed that in FIG. 1 the left-hand grinding roll 2 is mounted as a fixed roll, whilst the right-hand roll constitutes a floating roll which can be pressed elastically or resiliently against the fixed roll and can be displaced relative thereto (as is known per se).

The principles of the construction of such a grinding roll will be explained in greater detail below with regard to the cladding for protection against wear which is of particular interest herein In the case of the grinding roll 2 which is shown only partially in FIG. 2 it may be assumed that this comprises a roll body or core 6, the annular outer circumferential region of which has a type of roll casing or a circumferential casing region 7 which is shown in particular in this FIG. 2. The roll body 6 together with its circumferential casing region 7 can be produced according to the invention from a compression-proof and readily weldable basic roll material, for which any suitable material can be used, such as for example or preferably a 18 Ni—Cr—Mo—14.6 alloy or a similar basic iron alloy.

On the outer face or outer circumferential face of this circumferential casing region 7 is constructed a profiled cladding 8 for protection against wear which has outwardly projecting hard material strips 9 as well as depressions 10 lying between them in which particles of mill feed material are received and are to a certain extent firmly pressed in a layer, as is indicated at 11. Thus these pressed layers of mill feed material 11 (in the depressions 10) also form—in addition to the hard material strips 9—an essential part of the cladding 8 for protection against wear.

In all, this cladding 8 for protection against wear is produced by machining negative profilings, for instance in the form of profile grooves 12, into the material or into the basic roll material of the circumferential casing region 7 from the outside thereof, so that land-like profile projections 13 remain which are constructed in each case between two neighbouring profile grooves 12 or delimit these profile grooves. It is only onto these profile projections 13 that the hard material strips 9 are welded in each case like a layer by build-up welding of corresponding hard material.

Since during operation in a material bed roll mill such a grinding roll 2 is subjected not only to relatively great wear stresses but generally also to particularly high compression stresses, care must be taken to ensure a sufficient stability of this profiling of the cladding 8 for protection against wear despite the relatively narrow widths b of the profile projections 13 and also of the hard material strips 9 welded thereon. Accordingly it is advantageous if the groove-shaped depressions 10 (which also include the profile grooves 12) have an internal cross-section with a depth:width ratio (T:B) of approximately 0.4 to 0.75, wherein the depth (T) is formed by the sum of the radial land height $h_1$ of the exposed profile projections 13 and the radial material height $h_2$ of the hard material strips 9. The material height $h_2$ of the hard material strips 9 is advantageously chosen as a function of the nature (in particular the hardness and abrasiveness) of the mill feed material to be processed or comminuted and amounts to approximately 3 to 15 mm, preferably approximately 4 to 8 mm, as is indicated in FIG. 2 by different representations of thickness in the various hard material strips 9 which are shown. The profile grooves 12 and thus the depressions 10 for their part can have a maximum cross-sectional width B of approximately 30 to 40 mm in adaptation to or depending upon the mill feed material to be comminuted.

As is also indicated in FIG. 2, it may from time to time be advantageous to provide on at least one axial end **2*a* of the grinding roll 2 an edge strip 14 which is somewhat wider in the axial direction but which—exactly as in the remaining longitudinal portion of the roll—basically likewise consists of a profile projection 13 with a hard material strip 9 welded on it. Depending upon the use and the width of the entire roll, this edge strip 14** can have an axial width of approximately 20 to 50 mm.

Apart from the cross-sectional width B of the profile grooves which may be chosen advantageously, the cross-sectional shape thereof also has a certain importance insofar as it ensures a particularly reliable retention of the particles of mill feed material or the layer 11 of particles of mill feed material firmly pressed into the depressions 10 or profile grooves 12. In this sense at least the profile grooves 12 (and, if appropriate, also the entire depressions 10) should have an approximately rectangular to trapezoidal cross-section. In the representation according to FIG. 2 a rectangular cross-section is illustrated (with the internal width B and the total depth T). A trapezoidal cross-section of the profile grooves 12 is illustrated in FIG. 3 in a partial longitudinal sectional view, in which accordingly the trapezoidal cross-section tapers radially outwards (towards the outer face), i.e. the narrower sides of the trapezium of the groove cross-section lie approximately on the outer face of the casing circumference, so that to a certain extent an undercut groove shape is produced for the profile grooves 12 and as a result a particularly good pressing and durable retention of the layer 11 of particles of mill feed material is ensured.

The pattern of the said profilings of the cladding 8 for protection against wear can be adapted to various purposes for which the roll 2 may be used. In the representation in FIG. 2 it may be assumed that the profile grooves 12 and the land-like profile projections 13 are machined into the circumferential casing region 7 in such a way that they extend in the circumferential direction of the roll 2. In FIG. 4, on the other hand, a possibility is shown according to which the profile grooves 12 and the land-like profile projections 13 extend in the axial direction of the roll 2. Without it being necessary to illustrate this in any greater detail, it may be readily imagined that in case of need the profile grooves 12 and profile projections 13 could also be be constructed so that they extend approximately helically or diagonally on the outer face of the circumferential casing region 7.

In this roll 2 according to the invention it is also particularly advantageous if the hard material strips 9 are produced —by hard-facing—from a metal matrix with tungsten carbides or tungsten carbide particles embedded therein, the particle size of which is approximately 0.1 to 2 mm, preferably approximately 0.2 to 1.2 mm, and the proportion by volume of these tungsten carbides is approximately 50 to 80% of the total volume of the hard material strips 9 which are welded on. In this case the tungsten carbides can be provided for instance in the form of fused tungsten carbides or tungsten pellets. In an advantageous manner the metal matrix for the embedded tungsten carbides can consist of an alloy containing Ni, Cr, B, Si, an iron-based alloy with the elements C, Mn, Si, Cr and Mo or from an unalloyed welding additive.

There are also several possibilities for the purely structural make-up of the roll 2 according to the invention which may be explained with reference to the two grinding rolls 2 illustrated in cross-section in FIG. 1.

Thus—as already indicated with reference to FIG. 2—the left-hand grinding roll 2 in FIG. 1 can have a roll body 6 which is produced with its—approximately cylindrical—circumferential casing region 7, which is only indicated, in the form of a solid roll from forged steel or optionally also from cast iron.

In the case of the right-hand grinding roll 2 in FIG. 1 it may be assumed that the roll body 6 consists in a manner which is known per se of a basic roll body 6*a* and a roll casing which is separately fixed on this basic roll body 6*a* so as to be replaceable and which forms the circumferential casing region 7 described above. This roll casing which is provided on its outer face with the cladding 8 for protection against wear can for its part be constructed in different ways. According to the representation in the left-hand half (of the right-hand roll) in FIG. 1 this roll casing can be fixed in a manner which is known per se on the basic roll body 6*a* like a replaceable tyre 7*a* and can be provided on the outer face with the cladding 8 for protection against wear which is described with reference to FIG. 2. According to the representation in the right-hand half (of the right-hand roll) in FIG. 1, the tyre-like roll casing is divided to some extent into a plurality of casing segments 7*b* which are fixed on the basic roll body 6*a* so as to be replaceable and then have constructed on their outer face the profile grooves 12 and profile projections 13 which are explained in greater detail with reference to FIG. 2.

The way in which a roll or grinding roll 2 according to the invention can be advantageously produced has already been largely revealed by the foregoing description. According to this the or each grinding roll 2 is produced in a plurality of method steps as its cladding 8 for protection against wear is constructed, wherein the aforementioned profile grooves 12 are machined into the material of the circumferential casing region 7 from the outer face thereof and in them are received and pressed particles of the material to be processed or comminuted, and wherein the hard material strips 9 are only welded onto the profile projections 13 which delimit the profile grooves 12 or remain between these profile grooves 12. In this case a depth:width ratio (T:B) of approximately 0.4 to 0.75 should be maintained for the internal crosssection of the depressions 10, as has been explained above with reference to FIG. 2.

The hard material strips 9 which have also already been explained in greater detail above with regard to their material composition and other aspects of their construction can be applied to the profile projections 13 in various ways with the appropriate thickness or material height in each case by build-up welding.

One possibility for the type of build-up welding and thus for the construction of the cladding 8 for protection against wear consists first of all of machining the profile grooves 12 into the circumferential casing region 7 of the roll body 6 and then welding the hard metal alloy so as to form the hard material strips 9 on the outer face of the land-like profile projections 13 which remain standing adjacent to the profile grooves 12 or remain between each pair of neighbouring profile grooves 12. In this case the profile grooves 12 and the land-like profile projections 13 are for example produced either during casting of the roll body 6 or after production of the solid roll body 6 by corresponding milling or recessing into the material of the circumferential casing region 7.

With the prior production of the profile grooves 12 and profile projections 13 as just described it may in any case be advantageous to carry out the build-up welding of the hard metal alloy (to form the hard material strips 9) using moulding chills which are co-ordinated with the profile projections 13 while the build-up welding is being carried out, so that the hard material strips can be applied to the outer faces of the profile projections 13 with a particularly high accuracy of shape or dimensional consistency.

Another procedure in the construction of the cladding 8 for protection against wear on the outer face of the circumferential casing region 7 is first of all to weld the hard metal alloy on the outer face of the circumferential casing region 7 in the form of strips 9 according to a predetermined pattern corresponding to the profile grooves 12 to be machined in, and then to machine out the profile grooves 12, preferably by milling or recessing, in the region between the welded-on strips 9. In this way it is likewise possible to ensure an extremely good dimensional consistency and accurate shaping both of the hard material strips 9 and also of the profile projections 13 bearing them and thus also of the profile grooves 12.

Although many different welding processes could be used in order to apply the hard material strips 9 to their profile projections 13, PTA (plasma transferred arc) welding, MAG (metal active gas) welding, MIG (metal inert gas) welding and autogenous welding as well as welding with filler wires are preferred as particularly suitable welding processes.

In the case of any of the possibilities for production of the profiled cladding 8 for protection against wear which are explained with reference to the drawings, an optimum width of the profile grooves 12 can be achieved with relatively narrow profile projections 13, the width of the profile grooves 12 frequently being dependent upon the grain size of the feed material to be comminuted. In this case a relatively small width of the profile projections 13 leads to a comparatively low consumption of relatively expensive hard material for the hard material strips 9, without this resulting—whilst maintaining an optimum ratio of depth:width (T:B) of the profile depressions 10 as explained above—in the danger of breakage of the profile projections 13 (with the hard material strips 9 applied thereon) occurring during the high operating loads.

Considering now the material bed roll mill illustrated in

FIG. 1 in a schematic cross-sectional view, each of the two grinding rolls 2 installed therein can be constructed with a cladding for protection against wear according to at least one of the modes of construction described above. In this case there is basically also the possibility of constructing both rolls so that the profile grooves 12 and profile projections 13 with hard material strips 9 welded thereon are applied in the same way and are of the same dimensions, and of doing so in such a way that the profile grooves 12 of both grinding rolls 2 and the profile projections 13 with their hard material strips 9 lie precisely opposite one another in each case. This would be the case, for example, if both grinding rolls 2 of the material bed roll mill were of exactly the same construction as illustrated in FIG. 2.

However, a construction of the material bed roll mill is particularly preferred in which the two grinding rolls 2 are in principle composed and produced in the same way—apart from the particular dimensions of the profile grooves and the profile projections—as has been explained in particular with reference to FIGS. 2 and 3, but—as illustrated with the aid of FIG. 5—the profile grooves 12 and the land-like profile projections 13 (with the hard material strips 9 welded thereon) are applied to the circumferential casing region of one grinding roll opposite the profile groves and profile projections 13/hard material strips 9 on the circumferential casing region of the other opposing grinding roll 2' offset with respect to one another in such a way that—up to relatively narrow end portions—in each case profile grooves 12 filled with pressed-in particles of material (cf. layers of material 11) and profile projections 13 provided with hard material strips 9 preferably lie approximately symmetrically opposite one another. Thus this means that the profile groves 12 and profile projections of the two opposing grinding rolls 2, 2' are offset with respect to one another. In this case when both rolls have the same axial roll width the axial edge strips 14, 14' respectively advantageously have a correspondingly different axial width relative to one another and merely lie directly opposite one another in the outermost edge region, as can be seen from FIG. 5.

We claim:

1. A grinding roll for comminuting brittle material comprising a substantially cylindrical roll body having a plurality of spaced apart alternating lands and grooves at its periphery, and a wear resistant strip secured in overlying relation to each of said lands, each of said strips being formed of a substance harder than that forming said roll body and having a hardness sufficient to grind said material and having an area corresponding substantially to that of the underlying land, the groove between adjacent ones of said lands forming a depression for the accommodation of particles of said material, each of said depressions having a depth corresponding to the height of said adjacent ones of said lands and the strips overlying said adjacent ones of said lands.

2. The roll according to claim 1 wherein each of said depressions has a depth to width ratio of between about 0.4 to 0.75.

3. The roll according to claim 1 wherein each of said strips has a thickness of between about 3 to 15 mm.

4. The roll according to claim 1 wherein each of said strips has a thickness of between about 4 to 8 mm.

5. The roll according to claim 1 wherein each of said grooves has a maximum width of between about 30 to 40 mm.

6. The roll according to claim 1 wherein each of said grooves is substantially rectangular in cross-section.

7. The roll according to claim 1 wherein each of said grooves is substantially trapezoidal in cross-section and tapers in a direction outward of said body.

8. The roll according to claim 1 wherein said lands and grooves extend axially of said body.

9. The roll according to claim 1 wherein said lands and grooves extend circumferentially of said body.

10. The roll according to claim 1 wherein said strips are formed from a matrix material containing tungsten carbide particles.

11. The roll according to claim 10 wherein said particles have a size between 0.1 to 2 mm.

12. The roll according to claim 11 wherein said particles constitute between about 50 to 80% of the volume of said strips.

13. The roll according to claim 12 wherein said matrix material comprises an alloy containing Ni, Cr, B, and Si.

14. The roll according to claim 12 wherein said matrix material comprises an iron based alloy containing C, Mn, Si, Cr, and Mo.

15. The roll according to claim 12 wherein said matrix material comprises an unalloyed welding additive.

16. The roll according to claim 11 including a casing encircling said roll body, said roll body and said casing being formed of a weldable metal, said grooves extending into said casing.

17. The roll according to claim 11 wherein said roll body comprises a core and a tyre removably encircling said core, said lands and said grooves being formed in said tyre.

18. The roll according to claim 17 wherein said tyre is formed by a plurality of arcuate segments joined to one another.

19. A method of producing a grinding roll for comminuting brittle material comprising producing a substantially cylindrical roll body having alternating grooves and lands at the periphery of said body, and securing resistant-to-wear strips in overlying relation to each of said lands, said strips being formed of a substance harder than that forming said body and of sufficient hardness to grind said material.

20. The method according to claim 19 including forming each of said grooves to a depth to width ratio of between about 0.4 to 0.75, the depth being the sum of the height of the adjacent land and the thickness of the strip on such land.

21. The method according to claim 20 including forming each of said strips to a thickness of between about 3 to 15 mm.

22. The method according to claim 19 including forming each of said strips from a metal matrix containing tungsten carbide particles having a particle size of between about 0.1 to 2 mm, such particles constituting between about 50 to 80% of the volume of each of said strips.

23. The method according to claim 19 wherein said grooves first are formed in said body following which the strips are secured to said lands.

24. The method according to claim 19 wherein said roll body is produced by casting and wherein said grooves are formed during the casting of said body.

25. The method according to claim 19 wherein said roll body is produced by casting and wherein said grooves are machined in said body following the casting thereof.

26. In a material bed grinding roll mill having a pair of confronting, oppositely rotating rolls between which material to be comminuted may pass, the improvement wherein each of said rolls has a substantially cylindrical body having alternating grooves and lands at its periphery, and a resistant-to-wear strip secured in overlying relation to each of said lands, each said strip being formed of a substance harder than that forming said body and of sufficient hardness to grind said material.

27. The roll mill according to claim 26 wherein the grooves in one of said rolls are directly opposite the grooves in the other of said rolls.

28. The roll mill according to claim 27 wherein the grooves in each of said rolls are of uniform width.

29. The roll mill according to claim 26 wherein the grooves in one of said rolls are axially offset from the grooves in the other of said rolls.

30. The roll mill according to claim 29 wherein the width of each of said grooves is greater than that of each of said lands and wherein the lands of each of said rolls confront a groove in the opposite one of said rolls.

* * * * *